TEST FIXTURE FOR KEYED PRINTED CIRCUIT BOARD

Filed Nov. 15, 1965

4 Sheets-Sheet 1

INVENTORS F. G. BUHRENDORF
O. LOOSME
BY Leo Stanger
ATTORNEY

TEST FIXTURE FOR KEYED PRINTED CIRCUIT BOARD

Filed Nov. 15, 1965

3,375,408

TEST FIXTURE FOR KEYED PRINTED CIRCUIT BOARD

Frederick G. Buhrendorf, Colts Neck, and Oskar Loosme, Lincroft, N.J., assignors to Bell Telephone Laboratories, Incorporated, New York, N.Y., a corporation of New York Filed Nov. 15, 1965, Ser. No. 507,784
5 Claims. (Cl. 317—101)

ABSTRACT OF THE DISCLOSURE

A rigid universal extender hold a printed-circuit card longitudinally outward from a mounting panel to expose the card's circuit for test. The cards have edges keyed with notches to receive protuberances extending only from their respective jacks on the panel. Printed-circuit wiring on the extender connects the jack to the card. Longitudinally-movable fingers separate from the wiring and projecting beyond the printed wiring adjust themselves to the position of the notches on the card tested and thereby allow the extender to fit only into the panel jack belonging to that card.

This invention relates to test equipment, particularly for testing printed-circuit cards forming components of larger systems.

In such systems so-called apparatus mountings hold the individual cards vertically in arrays similar to books upon shelves. A connector area at the rear of each card snaps into a respective printed-circuit connector, which for purposes of simplicity may be loosely called a "jack." The latter connects the card to suitable power sources and to other cards. To prevent personnel from mistakenly plugging a particular card into a wrong one of the many available jacks, each jack is provided with a key block somewhere along the jack that slides into a key slot at the rear edge of the card near the connector area. By varying the position of the slot and the key block from card to card and from jack to jack the entire card array can be accurately assembled.

To provide access to predetermined test points on the individual cards, permanent test terminals project to the card's forward edge. However, the number of these preset test points and terminals are necessarily limited. Obtaining access to other card points requires removing the card from the array and thus breaking the connection between the card and its jack. This requires test personnel not only to furnish support for the card during testing but to energize the card. While the card's jack is a suitable energy source, failure on the part of personnel either to connect the conductors on the card to the correct jack openings or failure to connect them into the proper jack can lead to destruction of equipment and produce safety hazards.

An object of the invention is to avoid these difficulties, particularly by furnishing access to circuit points on the test card while energizing the card from correct potentials.

Another object of the invention is simultaneously to support the test card while furnishing such access and energy.

Still another object of the invention is to assure connection of each card only to the jack with which it properly mates while furnishing access to the card's circuitry.

According to the invention these ends are achieved by securing the test card to a rigid fixture that projects the card from the array and wherein a printed-circuit board electrically joins the lands on the card's conductor area with its appropriate jack on the appartaus mounting, while holding, along the length of the board and in line with the potential keying slots on the test card, a plurality of longitudinally movable shafts that the edge of the test card can force into openings in the jack and that the keying block in the jack can force in the other direction into the card's keying slots. Preferably, the shafts are all equally long. Preferably, the bracket firmly holds the board on the apparatus mounting and projects the card outwardly from the array in line with the board. Thus the card is rigidly supported and its circuit made accessible while the card and the keying block slide the shafts so that the board can enter only the jack with which the cardmates.

These and other features characterizing the invention are pointed out in the claims. Other objects and advantages of the invention will become obvious from the following detailed description when read in light of the accompanying drawing wherein:

Figure 2:
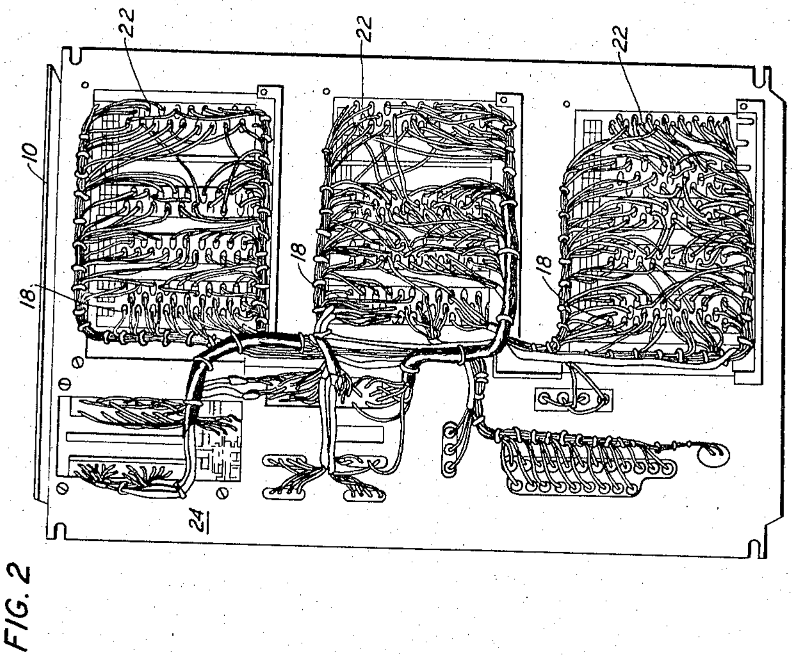
FIG. 2 is a rear view of FIG. 1.
Figure 1:
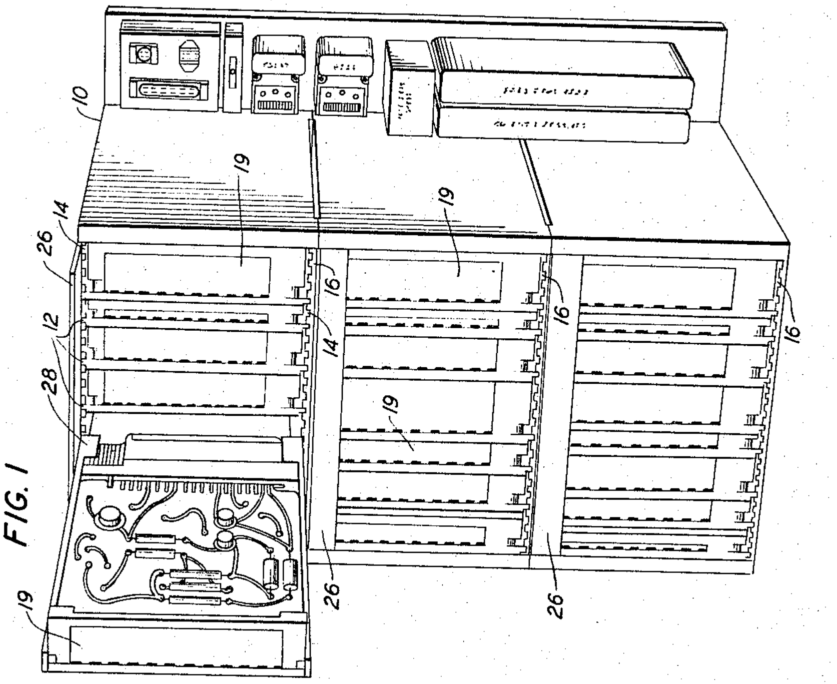
FIG. 1 illustrates an apparatus mounting in perspective view showing a test fixture according to the invention.

In FIG. 1 an apparatus mounting 10 supports three rows of vertically-oriented printed-circuti cards 12 in book shelf arrangement. Each card slides horizontally backwards into positions along suitable slots 14 on horizontal shelves 16 until it snaps into one of many connector jacks 18 at the rear of the mounting shown in FIG. 2. Each card carries a front plate 19. Suitable wiring 20 (FIG. 2) connects pins 22 extending from each jack 18 to the pins of other jacks 18 and to power sources, filters and external circuits all generally designated 24. A locking strip 26 extending across the top of each shelf of cards 12 is hinged at its top to swing to a horizontal postiion when a card is to be pulled out and to swing to a downward vertical position in which it is latched so as to secure the cards in position. The strip 26 along the top shelf is shown in the raised horizontal position in FIG. 1. The other two strips are swung down and latched into position.

A test fixture 28 at the top shelf in FIG. 1 displays the circuitry of one card 12 to be tested by holding the card outwardly from the array of cards and fitting into the slots 14. It connects the card to its jack by plugging into the jack.

Figure 3:
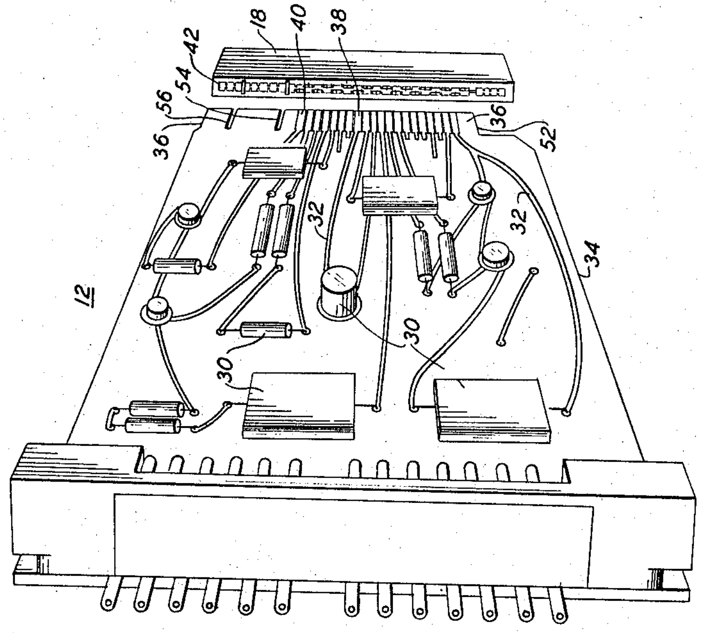
FIG. 3 is a perspective exploded view of a card and a jack from the mounting in FIG. 1 illustrating the manner in which the card is keyed to its individual jack.
Figures 4, 5:
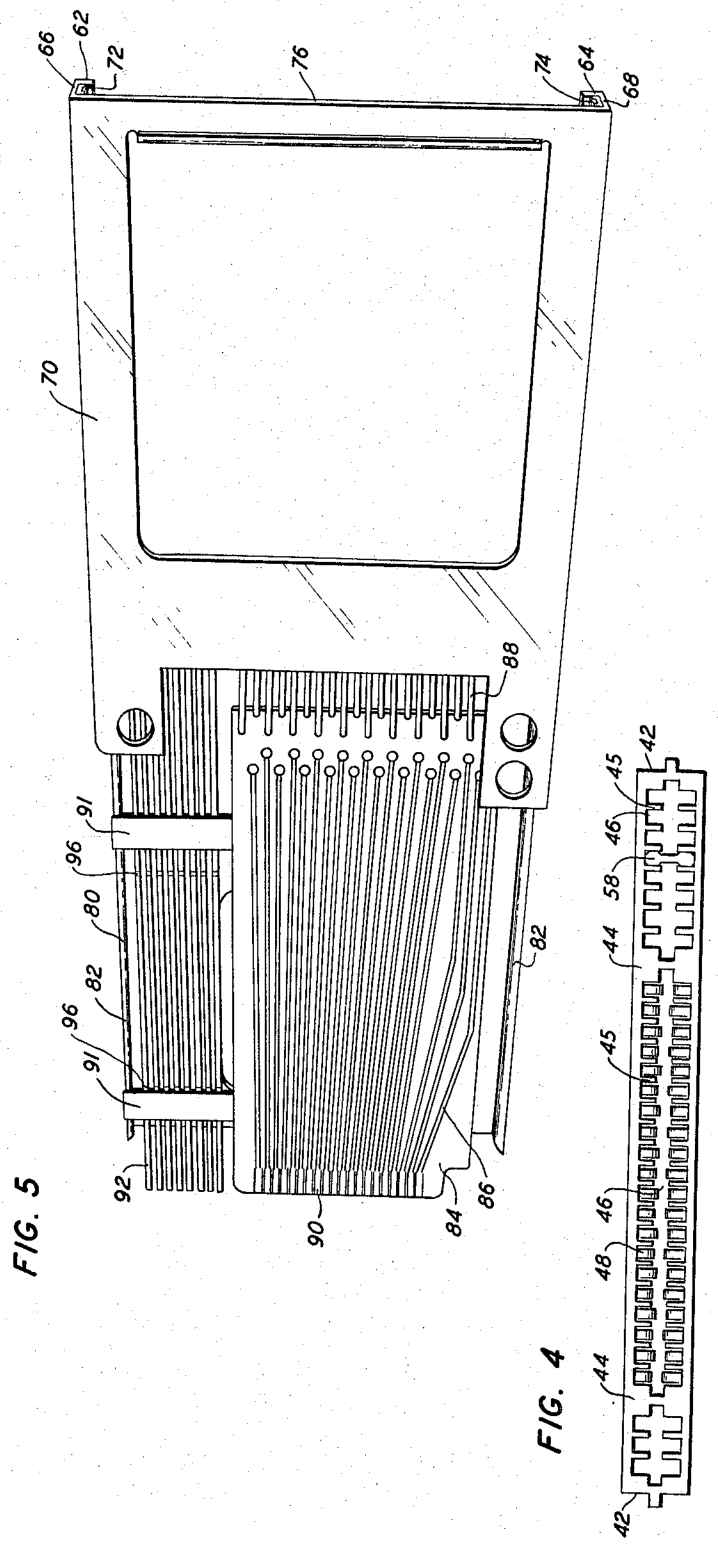
FIG. 4 is an elevation showing the face of a printed-circuit connector or jack.
FIGS. 5 and 6 are perspective views of a test fixture for holding cards according to the invention.

Details of the printed-circuit cards 12 and a jack 18 appears in FIGS. 3 and 4. FIG. 3 shows a card 12 and the jack 18 which it engages in an exploded view. FIG. 4 shows the jack 18 alone. As is the case with other cards, this card 12 includes components 30 connected by printed lands 32 deposited on a suitable rigid body 34. The lands terminate in a connector area 36 across a portion of the rear edge 38 of the card where they form uniformly spaced connector fingers 40. Structural end walls 42 and interior walls 44 are molded on the jack 18 at the ends and at unsymmetrically decentered positions. Between these walls 42 and 44 portions of the card's edge are capable of entering the jack by sliding between opposing ridges 45 that form compartments 46 in the jack 18. The compartments 46 hold contact clips 48 that project into the jack's interior from the pins 22. The opposing ridges 45 project toward each other at spaced locations but leave sufficient room between them so that the card can slide therethrough. In this way they differ from the structural walls 42 and 44 which have no opening and therefore block entry of the card.

Two longitudinal edges 50 and 52 and a slot 54 near the connector area 36 guide the card 12 into engagement with the jack 18 between the interior walls 44 and an end wall 42. These walls embrace the card at the respective edges when the card and jack mate. The opposing ridges 45 forming the compartments 46 also hold the card. Similarly, the contact clips 48 secure the card into position by applying pressure onto its lands. The effect of the walls is to align the fingers 40 with the compartments 46 so that the clips 48 apply pressure thereto and thereby connect the board and its components to be other boards and their energy sources. Because the interior walls 44 are unsymmetrically distributed they polarize the jack to receive the card only in one position. The key slot 54 must be present to prevent one of the interior walls 44 from blocking entry of the card 12.

A second slot 56 is aligned with one of the compartments 46 and receives a key block 58 fixed in the compartments 46 as the card enters the jack. Only the jack 18 shown with the card shown holds a key block 58 in this position along the entire top shelf. Thus, this card fits only into this jack. The other cards and jacks on this shelf exhibit other unique block and key slot combinations that permit mating only one card with a predetermined jack. In this manner destruction of valuable equipment through misplugging of cards into wrong jacks is avoided. This principle can be extended by furnishing each card with two key slots and each jack with two key blocks. This increases the number of combinations of unique jack and card matings in any system.

The facing 19 secured to the front edge of the card 12 holds a number of test terminals 61 that are electrically joined to predetermined test points on the cards.

Figure 7:
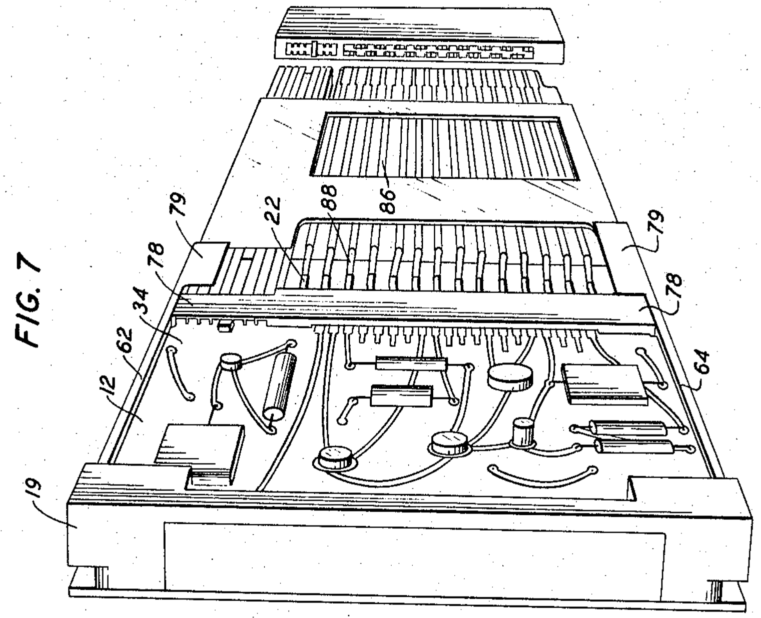
FIG. 7 is an exploded perspective view of the fixture in FIGS. 4 and 5 holding a card and entering a jack.
Figure 6:
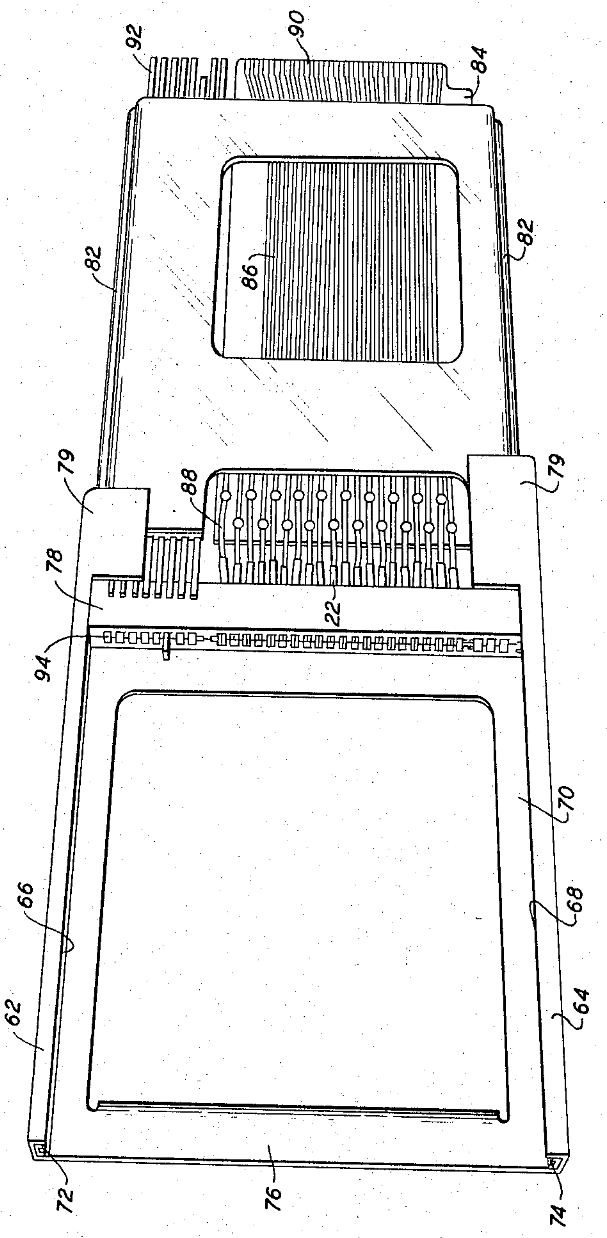

The test fixture of FIG. 1 appears in detail in FIGS. 5, 6 and 7. Here two flanges 62 and 64 form two channels 66 and 68 with a bracket body 70 from which the flanges extend integrally. Strips fastened in the channels form tracks 72 and 74 which guide the edges of a printed-circuit card from an entrance 76 toward a test jack 78 identical to the jacks 18 and mounted on the bracket body 70. The position of jack 78 is such as to mate with any printed-circuit card placed in the tracks 72 and 74. The jack 78 is provided with no key block 58. End tabs 79 on the flanges 62 and 64 are welded to an extension channel 80 having a pair of runners 82 aligned with the tracks 72 and 74 and measuring from edge to edge the width of a card 12 so as to fit into the slots 14 of the shelves 16. Coplanar with the runners 82 the channel 80 supports a printed-circuit board 84 whose lands 86 are connected by suitable wires 88 to the pins 22 on the jack 78. The lands 86 are continuous and terminate at the edge of the board 84 in fingers 90, corresponding to the fingers 40 on the cards 12. The locations of each finger 90 relative to the outer edges of the runners 82 are the same as the locations of the fingers 40 relative to the outer edges of the cards 12.

A pair of plastic guides 91 mounted on the bracket body 70 slidingly supports eight rectangular bars 92 in alignment with the compartments 94 in the jack 78 and in line with the compartments 46 in the jacks 18 into which the fixture may be placed. The bars 92 extend from the rear end of jack 78 to the finger edge of the board 84. Stops 96 along the bars limit individual longitudinal movement in both directions so that in one position one end of the bar reaches the finger edge of the board. In the other direction the stops 96 permit the bars 92 to slide until one end retracts from the finger edge and the other edge projects through the edge of compartment 94. The test fixture thus forms a rigid dummy card whose fingers can enter any jack and whose bars can adjust themselves with any keying block in the jack. Conversely, the fixture constitutes an extension to any printed-circuit card that enters the jack 78 and permits the bars to adjust themselves to the keying edge of the board. FIG. 7 illustrates the fixture holding a card and adjusted to the card for entry in the jack 18.

In operation, a person wishing to expose any card for test can unlatch the locking strip 26 and raise it to its horizontal position. He then can remove the card to be tested and slide it into the test fixture until its fingers 40 engage the jack 78. The card's keying edges 54 then pushes all the bars 92 except the one that can be received in its slot 56 so that they have their other ends aligned with the rear finger edge of the board 84. The operator then slides the fixture by means of its runners 82 into the slots 14 vacated by the cards to be tested until its fingers 90 snap into the jack 18. The keying block 58 in the jack 18 forces one of the rods into the opposite direction until it enters the slot 56 in the card. However, this happens only if the fixture holds the card 12 corresponding to the jack 18 with which it mates. If the incorrect card is being connected with the wrong jack the slot 56 and the keying block 58 will not be aligned with the same rod. Therefore, the key edge of the card and the block 58 will both be pushing one or more of the rods in opposite directions and will prevent union of the board with either the jack or the card.

If desired, an operator may place the test fixture into the jack before placing the card into the test fixture as shown in FIG. 7. Its operation will be effective in either case.

By virtue of the invention as illustrated, a unique combination of keys can be assigned to eight cards and eight jacks. The invention contemplates assigning more than one slot to each card and more than one block to each jack. In this manner the number of unique combinations can be extended. If, for example, each card has two key slots 56, twenty-eight unique combinations are available.

The invention thus can be effective in preventing costly destruction of equipment and subsequent waiting periods for its repair while at the same time permitting complete access to any card while it is energized.

One or any number of the fingers 90 may be considered as included in a term such as terminal means. At least part of the jack 78 may be considered as connector means. The channel 80 may be considered in part as part of rigid means and at least part of the loads 86 may be considered part of conductive means.

While an embodiment of the invention has been described in detail, it will be obvious to those skilled in the art that the invention may be otherwise practiced without departing from its spirit and scope.

What is claimed is:

1. A system comprising a plurality of printed-circuit cards each having terminal means and forming an edge having a longitudinal recess positioned according to a code differing from the code of the other cards, a panel supporting a plurality of printed-circuit jacks each having an opening with a key block corresponding in code to the recess of one of said cards, a plurality of said cards being plugged into respective ones of said jacks, rigid means having electrical means corresponding to said terminal means and having connector means corresponding to said jacks and opposite said electrical means, said rigid means including printed-circuit means stationary relative to said rigid means for connecting said electrical means to said connector means, said electrical means mating with one of said jacks, said terminal means on one of said cards mating with said connector means, and a plurality of longitudinally movable keying rods on said rigid means in contact with said edge on the one of said cards so as to assume the code of said one of said cards and entering the openings and contacting the block in said one of said jacks, said keying rods being electrically separate from said printed circuit means.

2. A test rig for keyed printed-circuit cards comprising terminal means, connector means capable of mating with said terminal means and with other terminal means corresponding to said terminal means, rigid means holding said connector means and said terminal means in opposite outwardly facing directions, a printed-circuit board stationary relative to said rigid means connecting said terminal means to said connector means, and longitudinally movable keying rods supported by said rigid means and extending from locations adjacent said terminal means to locations adjacent said connector means, whereby said rods can adjust themselves to the keying code on a card and the jack receiving the card, said board being fixed so as to remain stationary relative to said connector means and said terminal means before, during and after said rods adjust themselves, said movable rods being grouped separately from and being electrically separate from said board.

3. A test rig for keyed printed-circuit cards comprising a printed-circuit board having connector lands at one edge corresponding to the connector lands on the cards to be tested, a printed-circuit connector jack having conductive portions adapted to receive the lands on the cards to be tested and connected by printed wiring to the lands on the board, a bracket fixedly holding said board and said jack and having an extension for supporting the card to be tested so that it will mate with said jack, and a plurality of longitudinally movable keying rods supported in said bracket and extending from the vicinity of said jack to the vicinity of said lands on said board, said keying rods being in line with a keying area on said cards to be tested in line with keying area in mounting connectors receiving said board whereby the key code on said card to be tested adjusts said keying rods to its code, said connector lands on said board being fixed so as to remain stationary relative to said connector jack before as well as during and after said keying rods are adjusted, one of said keying rods projecting beyond the conductive portions of said jack when said rods mate with the keying area on said connector.

4. A test rig for keyed printed-circuit cards comprising a printed-circuit board having connector lands at one edge corresponding to the connector lands on the cards to be tested, a printed-circuit jack having conductive portions adapted to receive the lands on the cards to be tested and connected by printed wiring to the lands on the board, a bracket fixedly holding said board and said jack, said bracket having an extension projecting longitudinally outward from said jack, said extension having longitudinal ways for receiving a card to be tested and holding the card so it will mate with said jack, and a plurality of longitudinally movable keying rods supported in said bracket and extending from the vicinity of said jack to said lands on said board, said keying rods being in line with a keying area on said cards to be tested and in line with a keying area in mounting connectors receiving said board, whereby the key code on said card to be tested adjusts said keying rods to its code, said connector lands on said printed circuit board being fixed so as to remain stationary relative to said jack before as well as during and after said keying rods are adjusted, said rods being grouped separately from and being electrically separate from the lands on said board and from conductive portions of said jacks.

5. A system comprising a plurality of printed-circuit cards each having terminal means and each forming separate from said terminal means a keying edge having a recess extending longitudinally at a location according to a code differing from the code of the other cards, a panel supporting a plurality of printed-circuit jacks each having a connecting area and a keying area separate from the connecting area for receiving one of said edges and having a keying block located according to a code corresponding to the code of one of said cards, a plurality of said cards being plugged into respective ones of said jacks, a printed-circuit board having connector lands at one edge corresponding to the terminal means on the cards and plugged into one of said jacks, a female connector having aligned contacts capable of receiving the terminal means on the cards and connected by printed wiring to the lands on the board, a bracket fixedly holding said board and said jack and having an extension slidably receiving and supporting one of said cards so that it mates with said female connector, and a plurality of longitudinally movable keying rods mounted in said bracket in alignment and contact with said edge and said recess of the one of said cards so as to assume the code of said one of said cards and entering the keying area of the one of said jacks, said lands on said printed-circuit board being fixed so as to remain stationary relative to said terminal means before as well as during and after said keying rods assume the code, said rods being located as a group to one side of said board and being electrically separate from the lands on the board and from each other and from conductive portions of said jacks, said rods being positioned so as to prevent contact with portions of the cards at said terminal means when a card is plugged into said female connector, one of said rods projecting beyond the aligned contacts of said female connector when said board and said rods mate with one of said jacks and when the one of said rods is positioned to enter a recess in the one of said cards so as to inhibit terminal means on an incorrect card from contacting said female connector.

References Cited

UNITED STATES PATENTS 2,951,185 7/1960 Buck ---------------- 317—101

ROBERT K. SCHAEFER, *Primary Examiner.*

D. SMITH, *Assistant Examiner.*